US010045076B2

(12) United States Patent
Carnevale et al.

(10) Patent No.: US 10,045,076 B2
(45) Date of Patent: Aug. 7, 2018

(54) ENTERTAINMENT CONTENT RATINGS SYSTEM BASED ON PHYSICAL EXPRESSIONS OF A SPECTATOR TO SCENES OF THE CONTENT

(71) Applicant: International Business Machines Corporation, Armonk, NY (US)

(72) Inventors: Giulia Carnevale, Rome (IT); Marco Gianfico, Rome (IT); Fabrizio Loppini, Rome (IT); Roberto Ragusa, Rome (IT); Marco Vettori, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/358,191

(22) Filed: Nov. 22, 2016

(65) Prior Publication Data

US 2018/0146248 A1 May 24, 2018

(51) Int. Cl.
*H04N 7/173* (2011.01)
*H04N 21/442* (2011.01)
(Continued)

(52) U.S. Cl.
CPC ..... *H04N 21/44218* (2013.01); *G06K 9/0061* (2013.01); *G06K 9/00302* (2013.01);
(Continued)

(58) Field of Classification Search
CPC ........... H04N 21/44218; H04N 21/251; H04N 21/42203; H04N 21/44008;
(Continued)

(56) References Cited

U.S. PATENT DOCUMENTS

| 7,677,723 | B2 | 3/2010 | Howell et al. | |
|---|---|---|---|---|
| 8,782,681 | B2 | 7/2014 | Lee et al. | |
| 9,503,786 | B2 * | 11/2016 | el Kaliouby | ........... A61B 5/165 |
| 2012/0222058 | A1 * | 8/2012 | el Kaliouby | ......... H04N 21/251 |
| | | | | 725/10 |

(Continued)

FOREIGN PATENT DOCUMENTS

CN    201420857336    6/2015

OTHER PUBLICATIONS

Mail Online, Retrieved from Internet Jun. 29, 2016, http://www.dailymail.co.uk/scienceteoh/article-2408748/The-sensor-reads-heartbeat-feet-away-WI . . . , 66 pages.

*Primary Examiner* — John Schnurr
(74) *Attorney, Agent, or Firm* — Schmeiser, Olsen & Watts, LLP; Robert Shatto

(57) ABSTRACT

A method for generating a rating of entertainment content is provided. The method includes receiving data from a monitoring device associated with a spectator, the monitoring device communicatively coupled to the computing system, wherein the data obtained by the monitoring device includes a physical expression of the spectator viewing the entertainment content, analyzing the physical expression of the spectator to obtain (i) an eyesight direction of the spectator, and (ii) a facial expression of the spectator, during a scene of the entertainment content, determining an emotional reaction of the spectator to the scene of the entertainment content based on the analyzing of the physical expression of the spectator, calculating an emotional ranking of the scene of the entertainment content based on the emotional reaction of the spectator to the scene, and providing the overall ranking of the entertainment content in view of an aggregate of emotional reactions of the spectator.

18 Claims, 9 Drawing Sheets

(51) Int. Cl.
  *H04N 21/61*    (2011.01)
  *H04N 21/422*   (2011.01)
  *H04N 21/44*    (2011.01)
  *G06K 9/00*     (2006.01)
  *H04N 21/25*    (2011.01)
  *H04N 21/466*   (2011.01)
  *H04N 21/84*    (2011.01)

(52) U.S. Cl.
  CPC ..... *G06K 9/00335* (2013.01); *G06K 9/00362* (2013.01); *H04N 21/251* (2013.01); *H04N 21/42203* (2013.01); *H04N 21/44008* (2013.01); *H04N 21/4667* (2013.01); *H04N 21/6125* (2013.01); *H04N 21/84* (2013.01)

(58) Field of Classification Search
  CPC ........... H04N 21/4667; H04N 21/6125; H04N 21/84; G06K 9/00302; G06K 9/00335; G06K 9/00362; G06K 9/061
  See application file for complete search history.

(56) References Cited

U.S. PATENT DOCUMENTS

2012/0290401 A1*  11/2012  Neven ................... A61B 3/113
                                                    705/14.68
2012/0324491 A1*  12/2012  Bathiche ............... H04H 60/33
                                                    725/10
2013/0145385 A1    6/2013  Aghajanyan et al.
2014/0282646 A1*   9/2014  McCoy ............... G06K 9/00597
                                                    725/12

* cited by examiner

US 10,045,076 B2

ENTERTAINMENT CONTENT RATINGS SYSTEM BASED ON PHYSICAL EXPRESSIONS OF A SPECTATOR TO SCENES OF THE CONTENT

BACKGROUND

The present invention relates to an entertainment content ratings system, and more specifically to monitoring physical reactions of a spectator. The entertainment industry uses ratings to evaluate a success of movies, television programs, and other entertainment content. Traditional methods for obtaining a rating of entertainment content are limited to audience measurement systems that look at total audience, average age of audience member, household incomes, and other demographics based on a presumed view of the entertain content.

SUMMARY

An aspect of this invention relates to a method, and associated computer system and computer program product, for generating a rating of entertainment content. A processor of a computing system receives data from a monitoring device associated with a spectator, the monitoring device communicatively coupled to the computing system, wherein the data obtained by the monitoring device includes a physical expression of the spectator viewing the entertainment content. The physical expression is analyzed to obtain (i) an eyesight direction of the spectator, and (ii) a facial expression of the spectator, during a scene of the entertainment content. An emotional reaction of the spectator to the scene of the entertainment content is determined based on the analyzing of the physical expression of the spectator. An emotional ranking of the scene of the entertainment content is calculated based on the emotional reaction of the spectator to the scene. The overall ranking of the entertainment content is provided, in view of an aggregate of emotional reactions of the spectator.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Current methods for obtaining ratings or rankings of entertain content, such as movies, television programs, live shows, films, motion pictures, etc. are limited to broad conclusions regarding an entire audience. For example, content is rated based on viewer recording what content the viewer has consumed, or by electronic meters that can detect content being watched, downloaded, streamed, etc. However, these methods fall short in many ways to produce an accurate rating. Self-reporting, diary-based review methods include response bias in the reporting and viewing of content. Electronically metering or tabulated consumed content over a network can be misleading because the viewer may not even be paying attention to the content while the content is being broadcast. The self-reporting method and electronic metering is not present in movie theaters or live show theaters to receive feedback from the spectator. Further, no information about the viewer/spectator is obtained, and segments of the entertainment content are not reviewed or rated.

Thus, a need exists for an entertainment content ratings system and method that monitors and analyzes an emotional reaction of a spectator to one or more scenes of the entertainment content to obtain an accurate ranking of the entertainment content.

Figure 1:
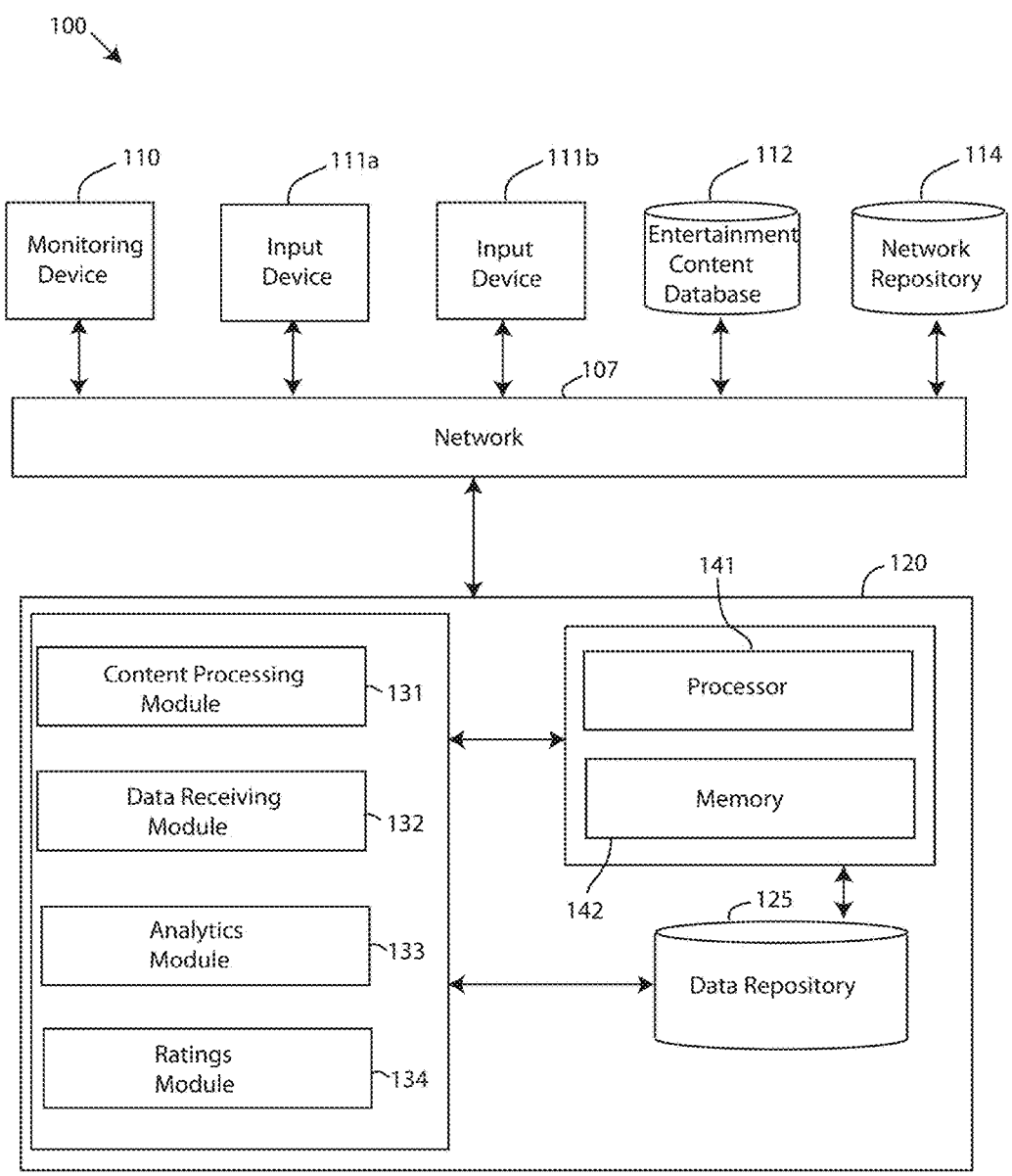
FIG. 1 depicts a block diagram of an entertainment content ratings system, in accordance with embodiments of the present invention.

Referring to the drawings, FIG. 1 depicts a block diagram of an entertainment content ratings system 100, in accordance with embodiments of the present invention. Embodiments of an entertainment content ratings system 100 may be described as a system for sentiment analytics of spectators of entertainment content. Spectator sentiment or emotional reaction to entertainment content, or to particular scenes of entertainment content, may be used to generate an emotional ranking of one or more scenes of the entertainment content. Based on an aggregate of emotional rankings, an overall rating or ranking of the content may be provided. A spectator may be monitored, continuously or otherwise, to obtain instant feedback of the spectator's experience or reaction to a scene of a movie. For instance, a physical expression, such as a heartbeat or facial expression, may be captured by a monitoring device when watching or otherwise consuming entertainment content. The monitoring device may be glasses, such as 3D glasses handed out by a movie theater, that include various cameras, sensors, and the like, to capture spectator data, such as a heartbeat or emotional expressions, during the movie. The reactions may be collected to analyze the audience members' reactions, individually or as a whole, to various scenes, twists, character arcs, etc. By using the analysis of the collected data of the spectator, the entertainment content ratings system 100 may rank the entertainment content in terms of emotional responses. Additionally, by monitoring an eyesight direction of the spectator with camera-equipped glasses, or other wearable technology, the entertainment ratings system 100 can determine an interest level of the spectator, as well as which part of the movie screen commands the most attention from the spectator. In some cases, the combination of the emotional reaction and the location that the spectator is looking can be used to confirm to a director of the movie if a particular scene had a desired effect, and may also provide useful insight into the spectator, such as their personality, likes, dislikes, attitude, gender, and the like. A profile may then be developed for a specific spectator for tailoring advertisements, offers, promotions, etc.

Embodiment of entertainment content ratings system 100 may comprise a monitoring device 110 and input device 111a, 111b communicatively coupled to a computing system 120 over a network 107. The number of input device 111a, 111b connecting to computer system 120 over network 107 may vary from embodiment to embodiment. As shown in FIG. 1, the monitoring device 110 and/or the input device 111a, 111b may transmit data about the spectator/viewer, such as physical movements, physical expressions, facial expressions, eyesight direction, physiological data (e.g. "spectator data") received from the monitoring device 110 and/or input device 111a, 111b by connecting to computing system 120 over the network 107. A network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the computer network 107 may be a peer-to-peer network in some embodiments, wherein in other embodiments, the network 107 may be organized as a client/server architecture.

In some embodiments, the network 107 may further comprise, in addition to the computer system 120, monitoring device 110 and input device 111a, 111b, a connection to one or more network accessible knowledge bases containing information of one or more users, network repositories 114 or other systems connected to the network 107 that may be considered nodes of the network 107. In some embodiments, where the computing system 120 or network repositories 114 allocate resources to be used by the other nodes of the network 107, the computer system 120 and network repository 114 may be referred to as servers.

The network repository 114 may be a data collection area on the network 107 which may back up and save all the data transmitted back and forth between the nodes of the network 107. For example, the network repository 114 may be a data center saving and cataloging spectator data sent by the monitoring device 110 and/or input device 111a, 111b to generate both historical and predictive reports regarding a particular spectator. In some embodiments, a data collection center housing the network repository 114 may include an analytic module capable of analyzing each piece of data being stored by the network repository 114. Further, the computer system 120 may be integrated with or as a part of the data collection center housing the network repository 114. In some alternative embodiments, the network repository 114 may be a local repository (not shown) that is connected to the computer system 120.

Referring still to FIG. 1, embodiments of the computing system 120 may receive the spectator data from the monitoring device 110 and/or input device 111a, 111b which may be positioned within an environment shared by the spectator, worn by the spectator, or otherwise disposed in a location that can result in obtaining spectator data. Input device 111a, 111b may be a sensor, an input device, or any input mechanism. For example, input devices 111a, 111b may be a biometric sensor, a wearable sensor, an environmental sensor, a camera, a camcorder, a microphone, a peripheral device, a computing device, a mobile computing device, such as a smartphone or tablet, facial recognition sensor, voice capture device, and the like. Embodiments of input device 111a, 111b may also include a heart rate monitor used to track a current or historical average heart rate of the spectator; wireless-enabled wearable technology, such as an activity tracker or smartwatch that tracks a heart rate; a blood pressure monitor; a perspiration sensor; and other wearable sensor hardware. Further embodiments of input device 111a, 111b not specifically listed herein may be utilized to collect spectator data.

Further embodiments of input means 111a, 111b may include one or more input devices or input mechanisms, including one or more cameras positioned proximate the spectator or within an environment shared by the spectator. The one or more environment cameras may capture image data or video data of an spectator, including a posture, facial expressions, perspiration, muscle activity, gestures, etc. Embodiments of the input device 111a, 111b may also include one or more microphones positioned nearby the spectator to collect audio relating to the spectator, and other hardware input devices, such as an audio conversion device, digital camera or camcorder, voice recognition devices, graphics tablet, a webcam, VR equipment, mouse, touchpad, stylus, and the like, which may help gauge a reaction by the spectator to a scene of a movie. Further embodiments of input device 111a, 111b may include a mobile computing device, such as a smartphone or tablet device, which may run various applications that contain data about the spectator. For example, a spectator's smartphone may be used as a sensor, and may also utilize the device's camera, microphone, and other embedded sensors to send information to the computing system 120. Moreover, embodiments of input device 111a, 111b may encompass other input mechanisms, such as a user computer that may send information to the computing system 120, wherein the user computer may be loaded with software programs that are designed to track an emotional output of the spectator.

Figure 2:
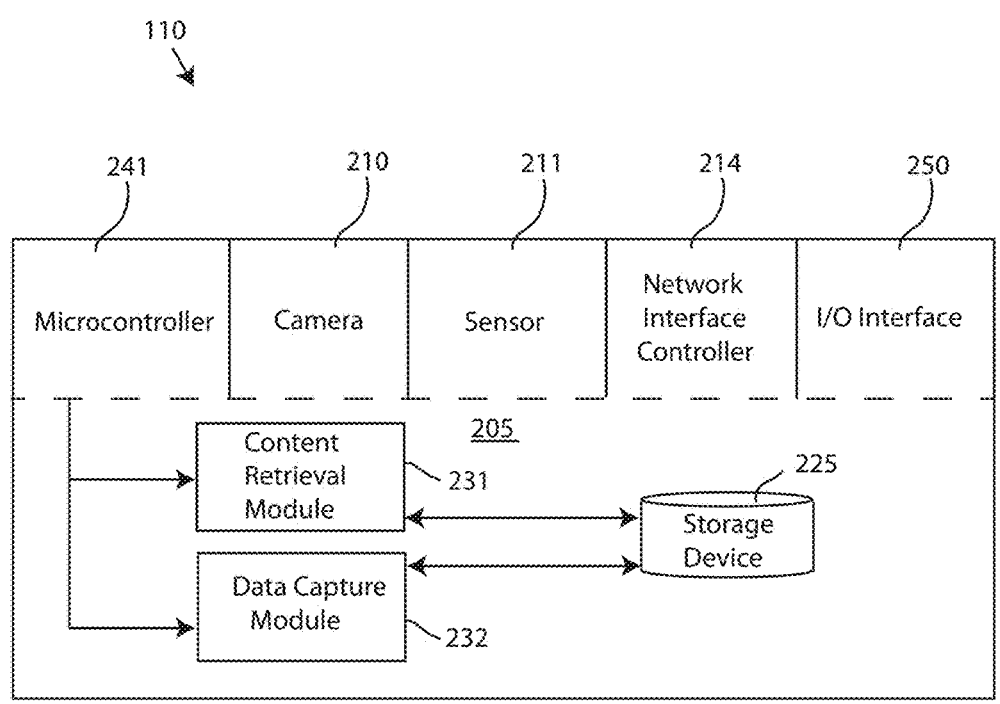
FIG. 2 depicts a block diagram of a monitoring device 110, which is part of the entertainment content ratings system of FIG. 1, in accordance with embodiments of the present invention.

FIG. 2 depicts a block diagram of a monitoring device 110, which is part of the entertainment content ratings system of FIG. 1, in accordance with embodiments of the present invention. Embodiments of the monitoring device 110 may include hardware and software components. For instance, embodiments of the monitoring device 110 may include hardware components such as a microcontroller 241, camera 210, sensor 211, network interface controller 214, and an I/O interface 250. Software components of the monitoring device 110 may be located in a memory system 205 of the monitoring device 110. Embodiments of the monitoring device 110 may include a microcontroller 241 for implementing the tasks associated with the monitoring device 110. In an exemplary embodiment, the computing system 120 may receive the spectator data from the monitoring device which may be worn by the spectator.

Figure 3:
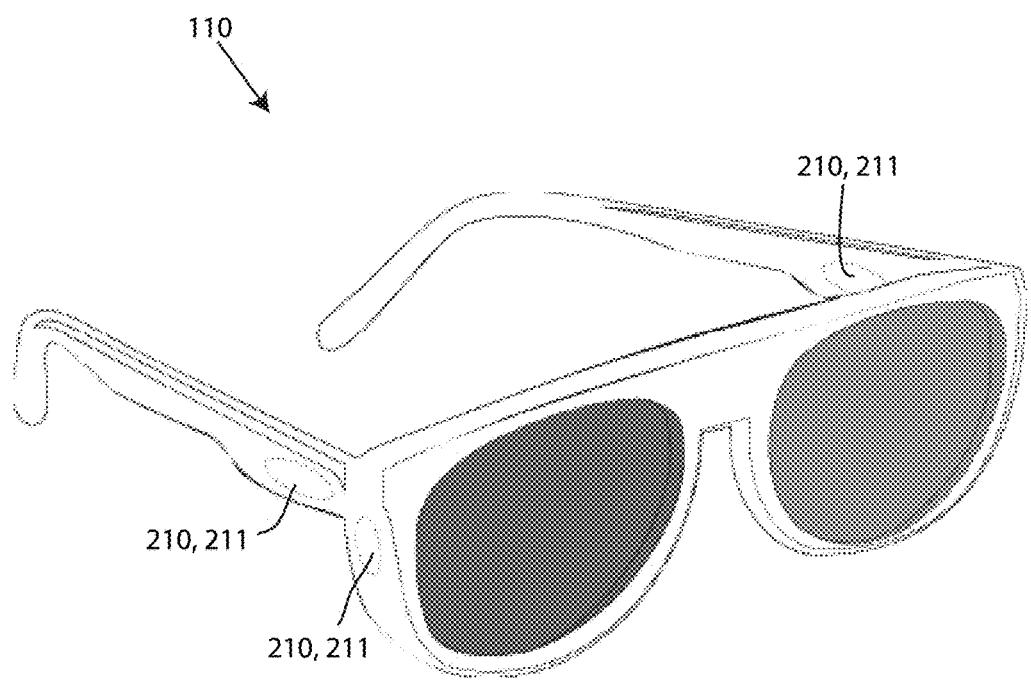
FIG. 3 depicts a perspective view of a monitoring device which is depicted as a block diagram in FIG. 2, which is part of the entertainment content ratings system depicted in FIG. 1, in accordance with embodiments of the present invention.

FIG. 3 depicts a perspective view of a monitoring device as depicted as a block diagram in FIG. 2, which is part of the entertainment content ratings system depicted in FIG. 1, in accordance with embodiments of the present invention. Embodiments of the monitoring device 110 may be wearable glasses, smart glasses, camera-equipped glasses, 3D movie theater glasses equipped with at least one camera, and the like. Embodiments of the monitoring device 110 may be wearable by the spectator while watching entertainment content. For example, the spectator may wear the monitoring device 110 while watching a movie at a movie theater. In movie theater embodiments, the movie theater may hand out monitoring devices 110 (e.g. glasses) to the spectators before entering the theater to watch a movie. The monitoring device 110 may also have 3-dimensional viewing capabilities for movies offered in 3D. Alternative embodiments of the monitoring device 110 may be a smart bracelet, a smart watch, or other wearable accessories that may be equipped with the hardware and software associated with the monitoring device 110.

Referring again to FIG. 2, embodiments of the monitoring device may have a camera 210. Embodiments of the camera 210 may be a camera, an image recognition system, one or more cameras, and the like. The camera 210 may be a lateral camera positioned on the glasses, so that the camera(s) may be lateral to the eye of the spectator, pointing laterally at the eye of the spectator. The camera 210 may capture, from the spectator, a movement of an eye, a movement of a nose, a movement of an eyebrow, a movement of a facial skin, a heartbeat, a movement of a pupil of the eye, a movement of an eyelid of the eye, and a movement of a lip. In an exemplary embodiment, the camera 210 of the monitoring device 210 may capture at least half of an eye of the spectator, a portion of a nose of the spectator, and a portion of an eyebrow of the spectator. Due to the proximity of the camera 210 of the monitoring device 110, micro expressions of facial movement and expressions may be captured in sufficient detail to be analyzed by the computing system 120 to determine an emotional reaction of the spectator to the entertainment content, or a specific scene of the content. Embodiments of the camera 210, or a separate component of the monitoring device 110, may be an image recognition system capable of deducing an emotion based on a micro expression or movement of the eye of the spectator.

In addition, the camera(s) 210 of the monitoring device 110 may be capable of detecting an eyesight direction of the spectator as the spectator watches the entertainment content. The eyesight direction may be determined by locating a position or angle position of the eye, or pupil/iris of the eye with respect to the monitoring device 110 or a lens of the monitoring device 110. Sensor(s), such as sensor 211 of the monitoring device 110 may be used to determine a position and orientation of the monitoring device 110 (or a lens surface thereof) in physical space. Exemplary embodiments of sensors 211 may include a gyroscope and/or accelerometer, or other comparable sensors that provided information regarding an orientation of an object in physical space. With a known angle/position of the eyes with respect to the monitoring device 110, and orientation information of the monitoring device 110, an eyesight direction may be determined at any point (e.g. for a particular scene) during the entertainment content. The eyesight direction of the spectator may indicate where the spectator is looking. For example, the eyesight direction may indicate whether the spectator is looking away from the movie screen, looking down at a cell phone, looking to a side of the spectator to speak with a companion, etc., which may allow the computing system 120 to conclude that the spectator is either not looking at the entertainment content or is not interested in the entertainment content at a particular point in the movie, or other content. Moreover, the eyesight direction obtained by the monitoring device 110 may be used to determine which area of the scene that the spectator is watching. In other words, the eyesight direction may indicate a segment of a display that the spectator is viewing during a scene. This may allow computing system 120 to develop an understanding of a spectator's interest and emotional reaction to not only a particular scene of the content, but a specific characteristic of the scene. For example, computing system 120 may receive information/spectator data regarding which locations of a scene on the screen are most interesting to the spectator, which actors/actresses are commanding the spectator's attention in a scene, as well as how an individual spectator visually tracks a scene of the content.

Accordingly, embodiments of the monitoring device 110 may capture or otherwise obtain spectator data, including an eyesight direction and physical expressions, which may be used to generate a rating or ranking of the entertainment content, as described in greater detail infra.

In some embodiments, the sensor 211 of the monitoring device 110 may be an additional biometric sensor or physiological data collecting device, which may be mounted to, built-in, or otherwise coupled to the monitoring device 110. In one embodiment, sensor 211 may be a heart rate monitor. In another embodiment, the sensor 211 may be a facial recognition sensor. Embodiments of the monitoring device 110 may include a plurality of sensors 211 having various functions, such as a heart rate monitor, accelerometer, gyroscope, a heat sensor, a perspiration detector, and the like.

Referring still to FIG. 2, embodiments of the monitoring device 110 may include a network interface controller 214. Embodiments of the network interface controller 214 may be a hardware component of the monitoring device 110 that may connect the monitoring device 110 to network 107. The network interface controller may transmit and receive data, including the transmission of spectator data acquired, collected, captured, or otherwise obtained by the monitoring device 110. In some embodiments, the spectator data may be stored in storage device 225 of memory system 205 of the monitoring device 110. The network interface controller 214 may access the storage device 225, and transmit the spectator data over the network 107 to the computing system 120. Additionally, embodiments of the monitoring device 110 may include an I/O interface 250. An I/O interface 250 may refer to any communication process performed between the monitoring device 110 and the environment outside of the monitoring device 110. Input to the monitoring device 110 may refer to the signals or instructions sent to the monitoring device 110, for example data or meta data of the entertainment content that is loaded onto the monitoring device 110, while output may refer to the signals sent out from the monitoring device 110.

Furthermore, embodiments of the memory system 205 of the monitoring device 110 may include a content retrieval module 231 and a data capture module 232. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory system 205 of the monitoring device 110. A module (whether hardware, software, or a combination thereof) may be designed to implement or execute one or more particular functions or routines.

Embodiments of the content retrieval module 231 may include one or more components of hardware and/or software program code for retrieving information/data of the entertainment content to be viewed by the spectator. In an exemplary embodiment, the monitoring device 110 may receive information/data of the entertainment content, which may be stored in the storage device 225. In some embodiments, the data of a movie to be watched by the spectator may be loaded onto the monitoring device 110 via I/O interface 250 and stored on the storage device 225. In other embodiments, the data of the movie to be watched may be downloaded via the network interface controller 214 and stored in the storage device 225. Embodiments of the data of the entertainment content may be data or meta data associated with the entertainment content to be viewed by the spectator, which may include scene-specific information, timing information, synchronization information, identifying information, director goals, movie studio company inserted queries, and the like. In one example, the data may include a version of a movie that has been previously tagged by a director of the movie so that one or more, or each, scene may be linked to an emotion that the director wants to elicit from or convey to the spectator. In another example, the content data may include a version of entertainment content that includes synchronization information so that the cameras 210 and sensors 211 of the monitoring device 110 are synchronized with the content being broadcast, streamed, projected, or otherwise displayed on a display screen for the spectator's viewing. Thus, the content retrieval module 231 may access the storage device 225 to obtain the content data, or may access an entertainment content database 112 over the network 107 to retrieve the entertainment content database.

Moreover, embodiments of the monitoring device 110 may include a data capture module 232. Embodiments of the data capture module 232 may include one or more components of hardware and/or software program code for capturing spectator data. The data capture module 232 may obtain spectator data from the hardware components of the monitoring device 110. For example, the monitoring device 110 may utilize cameras and sensors to obtain physical expressions of the spectator, as described above. Embodiments of the data capture module 232 may be configured to transmit the spectator data to the computing system 120 via network interface controller 214 over the network 7.

Furthermore, embodiments of the monitoring device 110 worn by a first spectator may be in communication with the input device 111*a*, 111*b*. The monitoring device 110 and the input device(s) 111*a*, 111*b* may interact with each other for collecting comprehensive, accurate, timely, and organized data, and sending to computing system 120. Additionally, the monitoring device 110 worn by the first spectator or the input device 111*a*, 111*b* associated with the first spectator may communicate with a monitoring device 110 worn by a second spectator and/or input device 111*a*, 111*b* associated with the second spectator. A first device may request help from another device to confirm a physical expression of the spectator or a data result from another device. For example, a facial recognition sensor of the monitoring device 110 may communicatively interact with a heartrate monitor bracelet worn by the first spectator to confirm whether the spectator is indeed feeling scared, and may additionally communicate with a thermal sensor to determine whether the spectator is possibly sweating based on a temperature of the spectator's environment (e.g. crowded theater). Further, embodiments of the monitoring device 110 associated with the spectator may be synchronized with other monitoring devices 110 associated with other spectators, or may be synchronized with input devices 111*a*, 111*b* associated with the spectator to provide accurate and timely data in combination to the computing system 120, such that an audience as a whole may be measured, and may be classified into categories such as seat location (e.g. front row, back row, etc.) within the theater, to determine whether scenes are more effective or reactive if experienced up close, or may be used to further profile the spectators.

Referring back to FIG. 1, embodiments of the computing system 120 may include a content processing module 131, a data receiving module 132, an analytics module 133, and a ratings module 134. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the content processing module 131 may include one or more components of hardware and/or software program code for retrieving, obtaining, or otherwise receiving information/data of the entertainment content to be viewed by the spectator. In an exemplary embodiment, the computing system 120 may receive information/data of the entertainment content, which may be stored in the data repository 125. The data of the movie to be watched may be received from the entertainment content database 112. For example, the content processing module 131 may query the entertainment content database 112 to receive necessary data or meta data associated with entertainment content viewed by the spectator. Embodiments of the entertainment content database 112 may include entertainment content, such as movies, television programs, or other video content. The database 112 may be maintained or otherwise controlled/managed by a content distributor. The entertainment content database 112 may be queried by the content processing module 131 when the spectator data is received from the monitoring device 110 (or input devices 111*a*, 111*b*), or may be received prior to receiving spectator data. Embodiments of the data of the entertainment content that is provided to the computing system 120 may be data or meta data associated with the entertainment content to be viewed by the spectator, which may include scene-specific information, timing information, synchronization information, identifying information, director goals, movie studio company inserted queries, as described above. Thus, the content processing module 131 may receive the entertainment content that is being viewed by the spectator wearing a monitoring device 110.

Embodiments of the computing system 120 may also include a data receiving module 132. Embodiments of the data receiving module 132 may include one or more components of hardware and/or software program code for receiving spectator data from the monitoring device 110, and/or the input device 111a, 111b. The data receiving module 132 may receive spectator data from the hardware components of the monitoring device 110. For example, the monitoring device 110 may utilize cameras and sensors to obtain physical expressions of the spectator, as described above, the data of which may be transmitted to the computing system 120 over the network 7. Embodiments of the data receiving module 132 may organize, classify, or otherwise categorize the spectator data as needed by the computing system 120.

Embodiments of the computing system 120 may further include an analytics module 133 for analyzing spectator data and determining an emotional response to a scene of entertainment content. Embodiments of the analytics module 133 may refer to configurations of hardware, software program code, or combinations of hardware and software programs, capable of analyzing data received from the monitoring device 110 and/or input device 111a, 111b and applying one or more data models to discover, identify, interpret and recognize the physical expression of the spectator. Embodiments of the physical expressions of the spectator may include a movement of an eye, a movement of a nose, a movement of an eyebrow, a movement of a facial skin, a heartbeat, a movement of a pupil of the eye, a movement of an eyelid of the eye, and a movement of a lip, which can be detected by the monitoring device 110. For example, embodiments of the analytics module 133 may analyze the physical expressions of the spectator to obtain an eyesight direction of the spectator, and a facial expression of the spectator, during a scene of the entertainment content. The analytics module 133 may rely on applications of statistics, computer programming, and the like, of the data collected and received by the analytics module 133 in order to determine the eyesight location and the facial expressions of the spectator. Embodiments of the analytics module 133 may analyze or otherwise interpret micro expressions of facial movement and other physical expressions that may be captured in sufficient detail by the monitoring device 110 to deduce the spectator data into facial expressions and eyesight location to determine an emotional reaction of the spectator to the entertainment content, or a specific scene of the content. For instance, the analytics module 133 may analyze the spectator data relating to a position of the eyes of the spectator to determine an eyesight location. The eyesight direction may be determined by comparing a location, a position or angle of the eye, or pupil/iris of the eye to a position of the monitoring device 110 or a lens of the monitoring device 110 and/or the location of the movie screen. Data received from sensor(s), of the monitoring device provide a position and orientation of the monitoring device 110 (or a lens surface thereof) in physical space, which may be utilized by the analytics module 133 to determine an eyesight location.

Further embodiments of the analytics module 133 may refer to configurations of hardware, software program code, or combinations of hardware and software programs, capable of analyzing data received from the monitoring device 110 and/or input device 111a, 111b and applying one or more data models to determine an emotional response of the spectator to a scene of the entertainment content. Embodiments of the analytics module 133 may determine an emotional response to a particular scene by analyzing the facial expression and the eyesight location. As described above, the eyesight direction of the spectator may indicate where the spectator is looking, which may allow the analytics module 133 to conclude that the spectator is either not looking at the entertainment content or is not interested in the entertainment content at a particular point in the movie, or other content. In other words, the analytics module 133 may confirm that the spectator is watching the entertainment content, and is interested in the content, based on the eyesight location. Once confirmed that the spectator is watching, the analytics module 133 may determine an emotional response or emotional reaction using the facial expressions derived by the analytics module 133 from the physical expressions obtained by the monitoring device 110. Embodiments of the analytics module 133 may examine the facial expression to determine an emotion of the spectator, while the spectator is viewing a particular scene of the content. Examining facial expressions may focus on one or more zones of the spectator's eyes. A plurality of emotions can be deduced from the facial expression data by analyzing, examining, or otherwise interpreting, by the analytics module 133, the micro expressions, physical expressions, and other movement of the spectator's eyes, nose, cheek, skin, eyebrow, and other facial features. As an example, the following emotions can be deduced by the computing system 120 as follows:

Surprise: the eyebrows are raised and curved and the skin below is stretched. The eyelid is opened with the white of the eye showing above and below the iris. When the eyes are wide open, the spectator experiences true surprise;

Fear: the eyebrows are drawn together like they were a flat line. The upper eyelid is raised, the lower is drawn up and tense. The white of the eye is showing only above the iris, not below and this particular alone is sufficient to distinguish surprise from fear.

Sadness: inner corners of the eyebrows are drawn in and then up. The skin below the eyebrows triangulated with inner corner up. This micro expression is the hardest to fake. Sadness can also be determined if the eyes are dry or watery as if the spectator is going to cry.

Happiness: a wrinkle runs from outer nose to outer lip when the cheeks are raised. The lower lid may show wrinkles or be tense. To be sure that is true happiness, the side eye muscles should be engaged by forming crow's feet near the outside of the eyes.

Disgust: the eyelids are raised like the cheeks and wrinkles appear on the nose. Lines show below the lower lid. In order to distinguish disgust from happiness, the system can trace the eyebrows, if they are drawn together cannot surely be happiness, and no participation of the side eye muscles.

Anger: the eyebrows are lowered and drawn together. Lower lid is tense, the eyes stare or are bulging. This micro expression also needs the layout of the nose and of the jaw, yet the system can safely assume the spectator is feeling anger when this pattern appears on his or her face.

Other emotions may be detected or determined by the analytics module 133. Further, the above listed emotions may be detected using other techniques, rules, information, etc. A degree of emotion may also be determined by the analytics module 133. For instance, if a scene made a user smile, then the analytics module 134 may determine that the spectator's emotional response/reaction was happy. However, in some embodiments, if the spectator smiled very wide, laughed for a long duration, laughed out loud, etc., the analytics module 134 may determine that the scene is funnier and made the spectator happier than other scenes that may have also resulted in the spectator's emotional reaction being happy. Accordingly, embodiments of the analytics module 134 may be able to determine a degree or scale of emotion, based on the detection of the spectators' physical expressions.

Moreover, the eyesight direction obtained by the monitoring device 110 may be used to determine which area of the scene that the spectator is watching. In other words, the analytics module 133 may analyze the eyesight direction to determine a segment of a display/screen that the spectator is viewing during a scene. This may allow computing system 120 to develop an understanding of a spectator's interest and emotional reaction to not only a particular scene of the content, but a specific characteristic of the scene. For example, the analytics module 133 may receive information/spectator data regarding which locations of a scene on the screen are most interesting to the spectator, which actors/actresses are commanding the spectator's attention in a scene, as well as how an individual spectator visually tracks a scene of the content.

With continued reference to FIG. 1, embodiments of the computing system 120 may include a ratings module 134. Embodiments of the ratings module 134 may include one or more components of hardware and/or software program code for calculating an emotional ranking of the spectator in response to a particular scene of the entertainment content. For instance, embodiments of the ratings module 134 may rank or rate a particular scene of the entertainment content based on the determined emotional reaction of the spectator. Each scene may be linked or otherwise associated with the emotional reaction of the spectator. In one embodiment, a scene that made the spectator cry may be rated as a sad scene of the entertainment content. In another embodiment, a scene that made the spectator laugh may be rated or ranked as a funny scene of the entertainment content. In each embodiment, the scenes of the entertainment content may be ranked or rated based on the emotion of the spectator. The ratings module 134 may also use the degree of emotional reaction to rate or rank a scene. If a first scene made the spectator scared, and a second scene made the spectator even more scared based on the spectator's physical expressions to the first scene and the second scene, the ratings module 134 may calculate a lower emotional ranking (scary) of the first scene than the emotional ranking (scary) of the second scene. In some embodiments, the ratings module 134 may use a scale or a spectrum of emotions to rate or rank a scene. For example, the ratings module 134 may rank a scene that made a spectator smile as a 1 on funny scale, but rank a scene that made the spectator laugh out and loud and turn to the spectator's companion and laugh with them a 10 (e.g. which may be captured by the monitoring device 110, such as with an outward facing camera that captures a reaction of the rest of the audience or a person sitting next to the spectator). The ratings module 134 may incorporate a separate scale or spectrum for each emotion, or have mixed emotional scale to rank or rate an emotional reaction to a particular scene.

Furthermore, embodiments of the ratings module 134 may rate or rank an emotional reaction of the spectator to a particular scene for multiple purposes. In one embodiment, the ratings module 134 may provide instant feedback about the movie based on the emotional reactions to the spectators to determine whether a particular scene was indeed funny or scary. In another embodiment, the ratings module 134 may confirm a director's intent to make a particular scene scary or sad, which may be used as a tool for studio's to evaluate the director of the content. In yet another embodiment, the ratings module 134 may be used as an information gathering tool for obtaining personal information about the spectator, such as their personality, interests, temperament, emotional quotient, level of intelligence, sophistication, and the like. This information may be used to tailor advertisements, offers, promotions, emails, etc. based on the spectator's emotional reaction to a particular scene. For example, the ratings module 134 (or other module of computing system 120) may create a profile of the spectator using the emotional reactions of the spectator. Embodiments of the ratings module 134 may access the spectator profile, which may categorize or catalog the spectator by age, sex, languages spoken, nationality, interest, emotional quotients, personality, likes, dislikes etc., and offer discounts or deals for movie tickets that are more likely to be taken advantage of by the spectator.

Moreover, embodiments of the ratings module 134 may also determine which portion or area of the scene drew the most attention of the spectator. For example, embodiments of the rating module 134 may augment or modify a rating of a scene that has a significant percentage of spectator's looking at a particular part of the scene. Further, the ratings module 134 may use the information regarding which area of the scene was most viewed to determine whether a particular directing technique worked or failed, which actor or actress commands the scene, and the like, all of which may be used for evaluation methods.

Further embodiments of the ratings module 134 may include one or more components of hardware and/or software program code for providing an overall rating of the entertainment content. Embodiments of the ratings module 134 may combine each ranking of the emotional reaction of the spectator to determine an overall rating of the entertainment content. Embodiments of the overall rating may be a numerical value, a text conclusion, a graphical representation of interest of the spectator as the movie progressed, a diagram of ell emotions evoked, and the like. The overall rating may also determine whether the entertainment content was as funny as promoted, scary as advertised, etc. Further, the overall rating may be used to determine whether the entertainment content is successful, well-appreciated, disliked, unmoving, boring, intense, etc., which is based on emotional reactions of the spectators. Embodiments of the ratings module 134 may provide the overall ranking of the entertainment content in view of an aggregate of emotional reactions of the spectator. Even further, embodiments of the ratings module 134 may provide the overall ranking of the entertainment content in view of an aggregate of emotional reactions of the entire audience in a theater, or each showing of content in a theater for a day, week, month, or for multiple theaters in one or more geographical locations. For instance, at the end of the movie, the ratings module 134 may provide an overall rating of the movie based on the aggregate emotional rankings of the spectator, but may also provide reports with other types of data and statistics, such as where geographically the content has been more appreciated, an age range of spectators that liked or disliked the movie, gender statistics, and the like. Embodiments of the ratings module 134 may provide a report or notify a third party of the results of the ratings for evaluation and the like.

Referring still to FIG. 1, embodiments of the computer system 120 may be equipped with a memory device 142 which may store the spectator data, emotional reactions/responses, scene ratings, entertainment content ratings, and the like, and a processor 141 for implementing the tasks associated with the entertainment content rating system 100.

Figure 4:
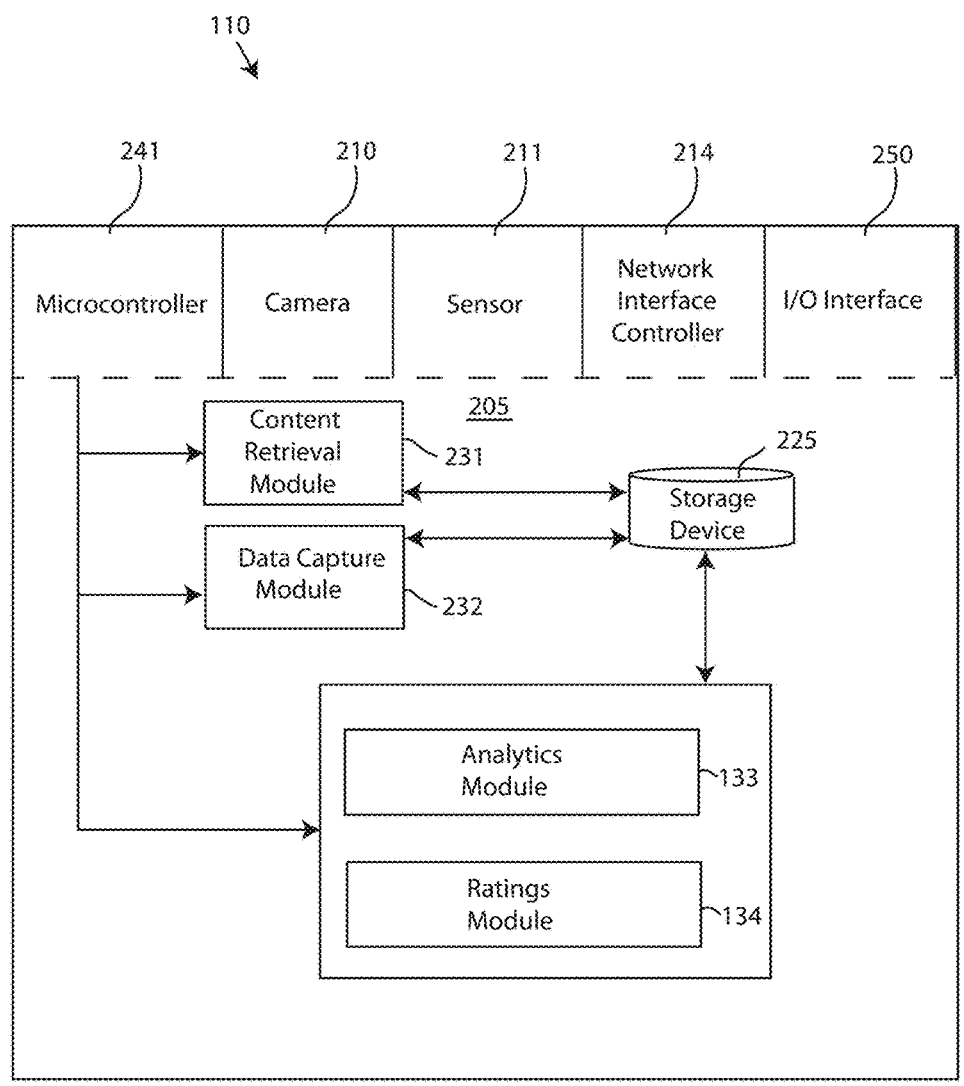
FIG. 4 depicts a block diagram of an alternative embodiment of a monitoring device, in accordance with embodiments of the present invention.

FIG. 4 depicts a block diagram of an alternative embodiment of a monitoring device 110, in accordance with embodiments of the present invention. Alternative embodiment of monitoring device 110 may perform the tasks associated with the analytics module 133 and the ratings module 134. For instance, rather than transmitting the spectator data to the computing system 120, embodiments of the monitoring device 110 may include a computing system capable of processing the spectator data and analyzing the spectator data to create a rating of entertainment content, in accordance with embodiments of the present invention. The ratings results may be transmitted to a remote server from the monitoring device 110.

Figure 5:
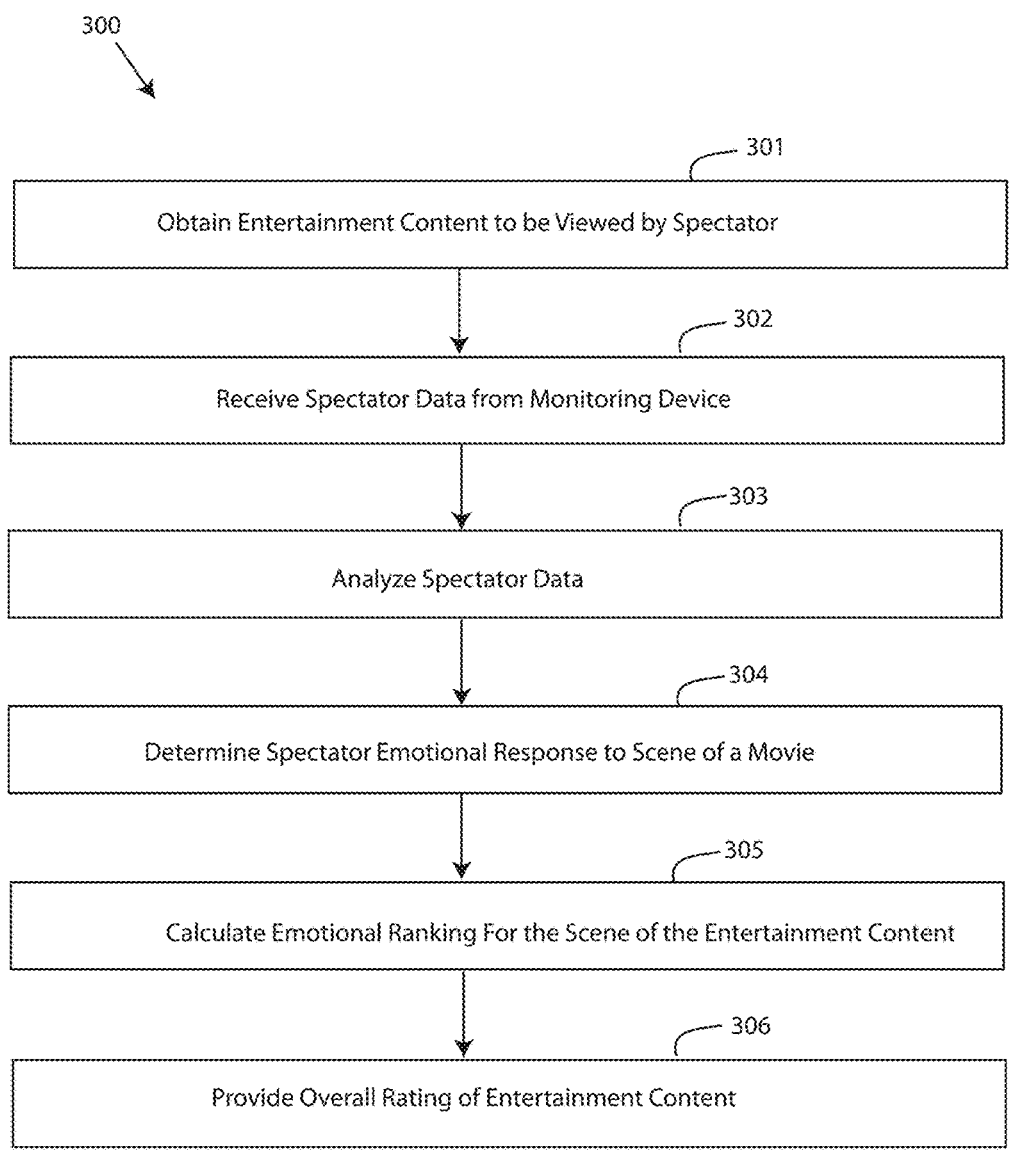
FIG. 5 depicts a flow chart of a method for generating a rating of entertainment content, in accordance with embodiments of the present invention.

Referring now to FIG. 5, which depicts a flow chart of a method 300 for generating a rating of entertainment content, in accordance with embodiments of the present invention. One embodiment of a method 300 or algorithm that may be implemented for generating a rating of entertainment content in accordance with the entertainment content ratings system 100 described in FIGS. 1-4 using one or more computer systems as defined generically in FIG. 6 below, and more specifically by the specific embodiments of FIGS. 1-4.

Embodiments of the method 300 for generating a rating of entertainment content may begin at step 301 wherein the entertainment content to be viewed by the spectator is received by the computing system 120. The content may be accessed over the network 107 from the entertainment content database 112, and may be synchronized with the content loaded on the monitoring device 110, so that the spectator's wearable monitoring device 110 provides accurate spectator data. Step 302 receives spectator data obtained by the monitoring device 110 and/or input device 111a, 111b. The spectator data may include various data regarding the spectator, including physical expressions of the spectator in response to viewing content. Step 303 analyzes the spectator data to obtain one or more facial expressions and/or an eyesight direction. In particular, the physical expressions of the spectator are analyzed to obtain the one or more facial expressions and/or the eyesight direction. Step 304 determines an emotional reaction or response of the spectator in response to a particular scene, using the facial expression and eyesight location.

Figure 6:
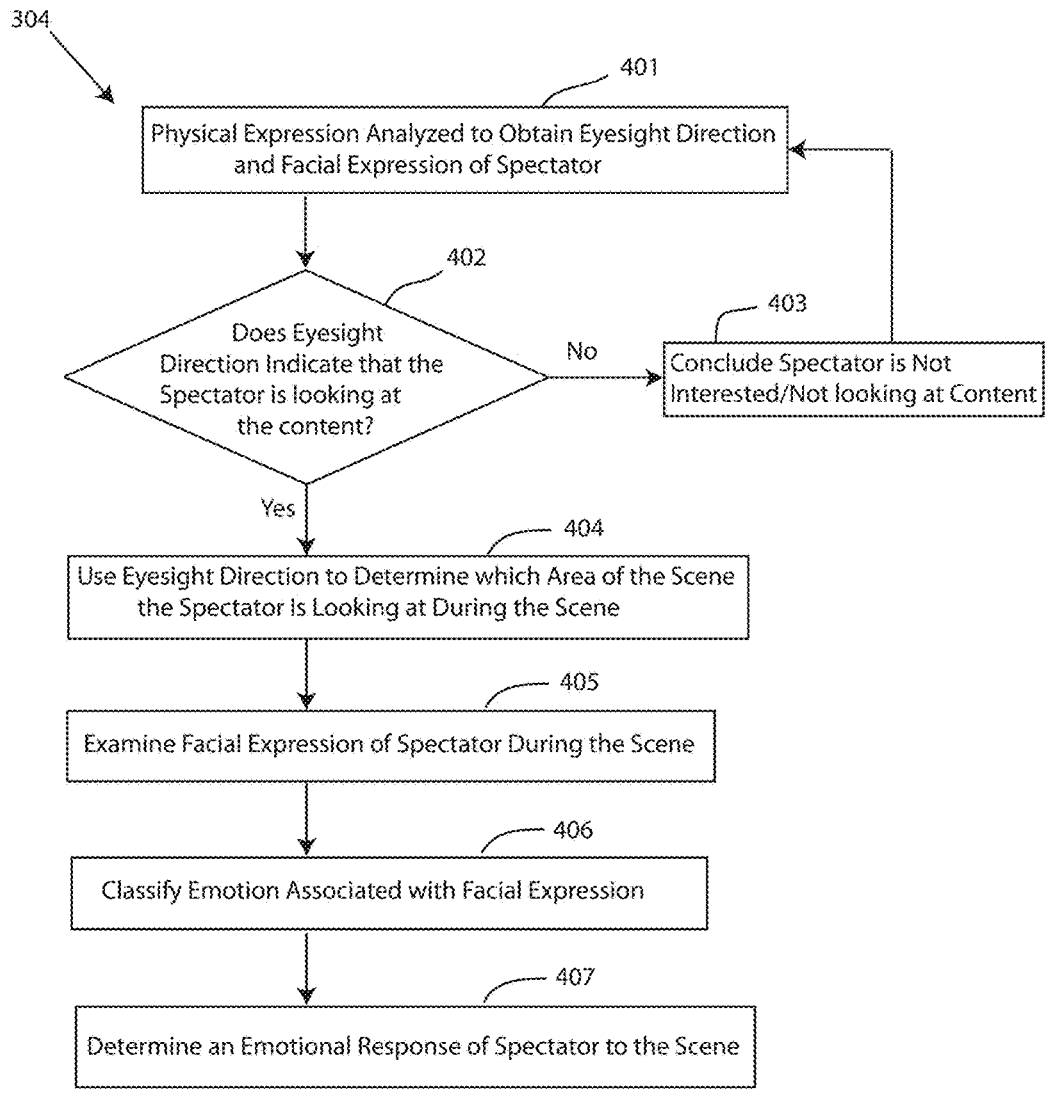
FIG. 6 depicts a flowchart of a step of the method of FIG. 5 for determining spectator emotional response to a scene of a movie, in accordance with embodiments of the present invention.

FIG. 6 depicts a flowchart of a step of the method of FIG. 5 for determining spectator emotional response to a scene of a movie, in accordance with embodiments of the present invention. Step 401 analyzes the physical expression to obtain eyesight direction and facial expression of the spectator. Step 402 confirms that the spectator is interested or at least looking at the content being displayed, by determining whether the eyesight direction indicates that the spectator is looking at the content or not. If the spectator is not looking or is not interested in the content, then step 403 concludes that the spectator is not interested or not looking, and resumes analysis of additionally received spectator data. If the spectator is looking at the content, then step 404 uses the eyesight direction to determine which area of the scene the spectator is looking at during the scene. Then, step 405 examines the facial expression of the spectator in response to a particular scene. Step 406 classifies an emotion associated with the facial expression. For example, the emotion associated with a particular facial expression is determined and linked with the particular scene. Step 407 then determines an emotional response or emotional ranking of the scene based on the spectator's emotional response to the scene.

Referring back to FIG. 5, step 305 calculates an emotional ranking or rating of the scene of the entertainment content. For instance, an emotional ranking or rating a particular scene of the entertainment content based on the determined emotional reaction of the spectator. Each scene may be linked or otherwise associated with the emotional reaction of the spectator. Step 306 provides an overall rating of the entertainment content, which may be provided in view of an aggregate of emotional reactions of the spectator to multiple scenes of the content.

Figure 7:
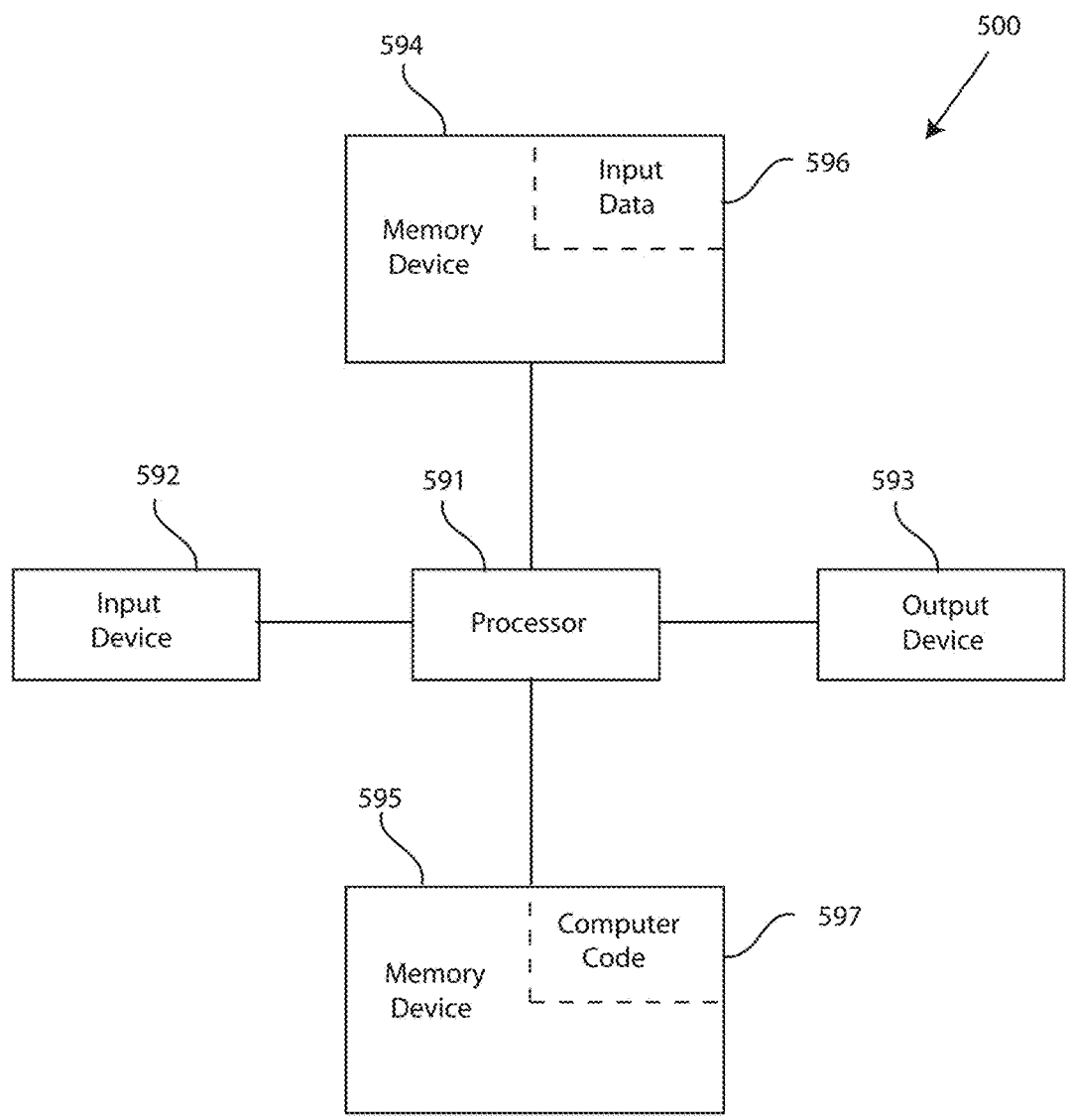
FIG. 7 illustrates a block diagram of a computer system for the entertainment content ratings system of FIG. 1, capable of implementing methods for generating a rating of entertainment content of FIG. 5, in accordance with embodiments of the present invention.

FIG. 7 illustrates a block diagram of a computer system 500 that may be included in the system of FIGS. 1-3 and for implementing the methods of FIGS. 4-6 in accordance with the embodiments of the present disclosure. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for generating a rating of entertainment content, in the manner prescribed by the embodiments of FIGS. 3-5 using the entertainment content ratings system of FIGS. 4-5, wherein the instructions of the computer code 597 may be executed by processor 591 via memory device 595. The computer code 597 may include software or program instructions that may implement one or more algorithms for implementing the methods of for generating a rating of entertainment content, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN)

or a wide area network (WAN). Further, memory devices 594, 595 may include an operating system (not shown) and may include other systems not shown in FIG. 6.

In some embodiments, the computer system 500 may further be coupled to an Input/output (IO) interface and a computer data storage unit. An I/O interface may include any system for exchanging information to or from an input device 592 or output device 593. The input device 592 may be, inter alia, a keyboard, a mouse, etc. or in some embodiments the sensors 110. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to content rating systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to provide a rating of entertainment content. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for generating a rating of entertainment content. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for generating a rating of entertainment content.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
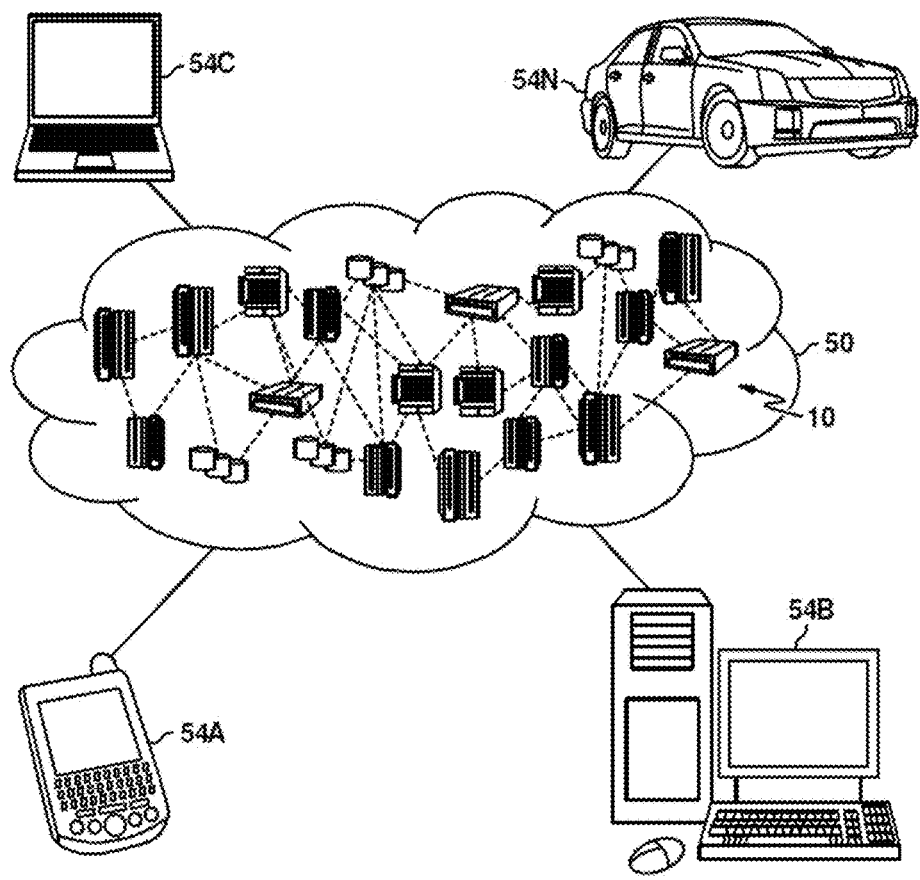
FIG. 8 depicts a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 9:
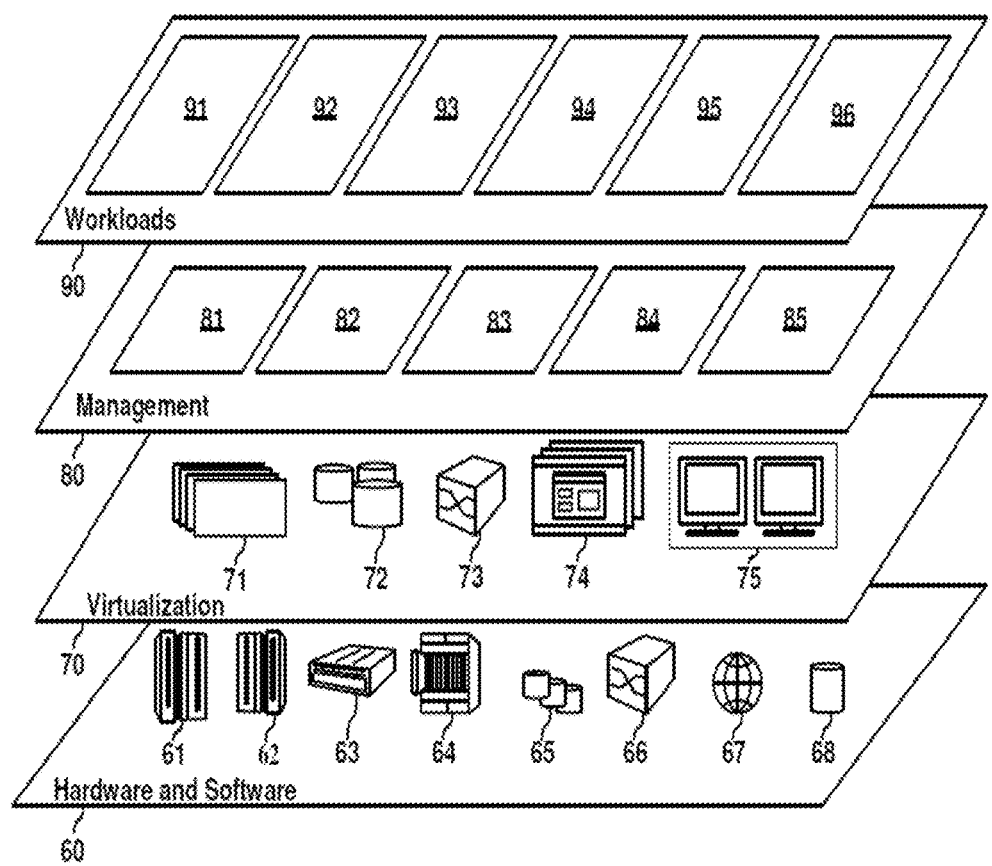
FIG. 9 depicts abstraction model layers, in accordance with embodiments of the present invention.

Referring now to FIG. 9, a set of functional abstraction layers provided by cloud computing environment 50 (see FIG. 8) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and ratings generation for entertainment content 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method for generating an overall rating of entertainment content, the method comprising:

receiving, by a processor of a computing system, data from a wearable monitoring device associated with a spectator, the wearable monitoring device communicatively coupled to the computing system, wherein the data obtained by the wearable monitoring device includes a physical expression of the spectator viewing the entertainment content, the physical expression being captured by a lateral camera of the wearable monitoring device, the lateral camera being positioned laterally to an eye of the spectator such that the lateral camera captures at least half of an eye of the spectator, a portion of a nose of the spectator, and a portion of an eyebrow of the spectator, from a side of the spectator;

synchronizing, by the processor, the entertainment content viewed by the spectator and a content loaded and stored on the wearable monitoring device so that the wearable monitoring device provides accurate data, wherein the content stored on the wearable monitoring device is a version of the entertainment content that includes synchronization information so that that the lateral camera and a heartbeat monitor of the wearable monitoring device can be synchronized with the entertainment content viewed by the spectator;

analyzing, by the processor, the physical expression of the spectator captured by the lateral camera to obtain (i) an eyesight direction of the spectator, and (ii) a facial expression of the spectator, during a scene of the entertainment content;

determining, by the processor, an emotional reaction of the spectator to the scene of the entertainment content based on the analyzing of the physical expression of the spectator;

calculating, by the processor, an emotional ranking of the scene of the entertainment content based on the emotional reaction of the spectator to the scene; and providing, by the processor, the overall ranking of the entertainment content in view of an aggregate of emotional reactions of the spectator;

wherein data of the entertainment content is loaded and stored on the wearable monitoring device.

2. The method of claim 1, wherein the physical expression of the spectator includes a movement of an eye, a movement of a nose, a movement of an eyebrow, a movement of a facial skin, a heartbeat, a movement of a pupil of the eye, a movement of an eyelid of the eye, and a movement of a lip.

3. The method of claim 1, further comprising: creating, by the processor, a profile of the spectator using the emotional reactions of the spectator.

4. The method of claim 1, wherein the step of determining the emotional reaction of the spectator includes confirming, by the processor, that the spectator is interested in the scene of the movie based on the eyesight direction of the spectator, and examining, by the processor, the facial expression of the spectator to determine a micro-expression of the spectator that is associated with at least one emotion.

5. The method of claim 4, wherein the eyesight direction confirms the interest of the spectator in the scene of the movie, and the eyesight direction is also used to determine Inch area of the scene commands the most attention of the spectator.

6. The method of claim 1, wherein the wearable monitoring device is a wearable pair of glasses, the wearable pair of glasses having an image recognition system.

7. A computer system, comprising:
a processor;
a memory device coupled to the processor;
a wearable monitoring device coupled to the processor over a network interface, the wearable monitoring device including a microcontroller, the microcontroller coupled to a lateral camera of the wearable monitoring device; and a computer readable storage device coupled to the processor, wherein the storage device contains program code executable by the processor via the memory device to implement a method for generating an overall rating of entertainment content, the method comprising:

receiving, by a processor of a computing system, data from the wearable monitoring device associated with a spectator, the wearable monitoring device communicatively coupled to the computing system, wherein the data obtained by the wearable monitoring device includes a physical expression of the spectator viewing the entertainment content, the physical expression being captured by the lateral camera of the wearable monitoring device, the lateral camera being positioned laterally to an eye of the spectator such that the lateral camera captures at least half of an eye of the spectator, a portion of a nose of the spectator, and a portion of an eyebrow of the spectator, from a side of the spectator;

synchronizing, by the processor, the entertainment content viewed by the spectator and a content loaded and stored on the wearable monitoring device so that the wearable monitoring device provides accurate data, wherein the content stored on the wearable monitoring device is a version of the entertainment content that includes synchronization information so that that the lateral camera and a heartbeat monitor of the wearable monitoring device can be synchronized with the entertainment content viewed by the spectator, analyzing, by the processor, the physical expression of the spectator captured by the lateral camera to obtain (i) an eyesight direction of the spectator, and (ii) a facial expression of the spectator, during a scene of the entertainment content;

determining, by the processor, an emotional reaction of the spectator to the scene of the entertainment content based on the analyzing of the physical expression of the spectator;

calculating, by the processor, an emotional ranking of the scene of the entertainment content based on the emotional reaction of the spectator to the scene; and providing by the processor, the overall ranking of the entertainment content in view of an aggregate of emotional reactions of the spectator.

8. The computer system of claim 7, wherein the physical expression of the spectator includes a movement of an eye, a movement of a nose, a movement of an eyebrow, a movement of a facial skin, a heartbeat, a movement of a pupil of the eye, a movement of an eyelid of the eye, and a movement of a lip.

9. The computer system of claim 7, further comprising: creating, by the processor, a profile of the spectator using the emotional reactions of the spectator.

10. The computer system of claim 7, wherein the step of determining the emotional reaction of the spectator includes confirming, by the processor, that the spectator is interested in the scene of the movie based on the eyesight direction of the spectator, and examining, by the processor, the facial expression of the spectator to determine a micro-expression of the spectator that is associated with at least one emotion.

11. The computer system of claim 10, wherein the eyesight direction confirms the interest of the spectator in the scene of the movie, the eyesight direction is also used to determine which area of the scene commands the most attention of the spectator.

12. The computer system of claim 7, wherein the wearable monitoring device is a wearable pair of glasses.

13. A computer program product, comprising a computer readable hardware storage device storing a computer readable program code, the computer readable program code comprising an algorithm that when executed by a computer processor of a computing system implements a method for generating an overall rating of entertainment content, comprising:
receiving, by a processor of a computing system, data from a wearable monitoring device associated with a spectator, the wearable monitoring device communicatively coupled to the computing system, wherein the data obtained by the wearable monitoring device includes a physical expression of the spectator viewing the entertainment content, the physical expression being captured by a lateral camera of the wearable monitoring device, the lateral camera being positioned laterally to an eye of the spectator such that the lateral camera captures at least half of an eye of the spectator, a portion of a nose of the spectator, and a portion of an eyebrow of the spectator, from a side of the spectator;
synchronizing. by the processor. the entertainment content viewed by the spectator and a content loaded and stored on the wearable monitoring device so that the wearable monitoring device provides accurate data, wherein the content stored on the wearable monitoring device is a version of the entertainment content that includes synchronization information so that that the lateral camera and a heartbeat monitor of the wearable monitoring device can be synchronized with the entertainment content viewed by the spectator;
analyzing, by the processor, the physical expression of the spectator captured by the lateral camera to obtain (i) an eyesight direction of the spectator, and (ii) a facial expression of the spectator, during a scene of the entertainment content;
determining, by the processor, an emotional reaction of the spectator the scene of the entertainment content based on the analyzing of the physical expression of the spectator;
calculating, by the processor, an emotional ranking of the scene of the entertainment content based on the emotional reaction of the spectator to the scene; and
providing, by the processor, the overall ranking of the entertainment content in view of an aggregate of emotional reactions of the spectator.

14. The computer program product of claim 13, wherein the physical expression of the spectator includes a movement of an eye, a movement of a nose, a movement of an eyebrow, a movement of a facial skin, a heartbeat, a movement of a pupil of the eye, a movement of an eyelid of the eye, and a movement of a lip.

15. The computer program product of claim 13, further comprising: creating, by the processor, a profile of the spectator using the emotional reactions of the spectator.

16. The computer program product of claim 13, wherein the step of determining the emotional reaction of the spectator includes confirming, by the processor, that the spectator is interested in the scene of the movie based on the eyesight direction of the spectator, and. examining, by the processor, the facial expression of the spectator to determine a microexpression of the spectator that is associated with at least one emotion.

17. The computer program product of claim 16, wherein the eyesight direction confirms the interest of the spectator in the scene of the movie, the eyesight direction is also used to determine which area of the scene commands the most attention of the spectator.

18. The computer program product of claim 13, wherein the wearable monitoring device is a wearable pair of glasses.

* * * * *